US012235997B2

(12) United States Patent
Singh et al.

(10) Patent No.: US 12,235,997 B2
(45) Date of Patent: Feb. 25, 2025

(54) CONTEXTUAL TAB AWARE APP PROTECTION

(71) Applicant: CITRIX SYSTEMS, INC., Fort Lauderdale, FL (US)

(72) Inventors: Manbinder Pal Singh, Coral Springs, FL (US); Santosh Gummunur Chiranjeevi Sampath, Karnataka (IN)

( * ) Notice: Subject to any disclaimer, the term of this patent is extended or adjusted under 35 U.S.C. 154(b) by 733 days.

(21) Appl. No.: 17/304,660

(22) Filed: Jun. 24, 2021

(65) Prior Publication Data

US 2022/0414240 A1 Dec. 29, 2022

(51) Int. Cl.
*G06F 21/62* (2013.01)
*G06F 21/00* (2013.01)
*G06F 21/31* (2013.01)
*G06F 21/60* (2013.01)
*H04L 9/40* (2022.01)

(52) U.S. Cl.
CPC .......... *G06F 21/629* (2013.01); *G06F 21/604* (2013.01); *H04L 63/101* (2013.01); *G06F 21/31* (2013.01)

(58) Field of Classification Search
CPC ...... G06F 21/629; G06F 21/604; G06F 21/62; G06F 21/6209; G06F 21/6245; G06F 21/6272; G06F 21/6281
See application file for complete search history.

(56) References Cited

U.S. PATENT DOCUMENTS

| 2017/0269976 | A1* | 9/2017 | Venkataraman ..... G06F 11/3438 |
| 2017/0293419 | A1 | 10/2017 | Dipin |
| 2018/0027019 | A1* | 1/2018 | Ligman .................. G06F 21/54 726/1 |

FOREIGN PATENT DOCUMENTS

CN 111198046 5/2020

OTHER PUBLICATIONS

U.S. Appl. No. 17/658,877, filed Apr. 12, 2022 Singh et al.
Anonymous "Method for blocking Print Screen feature of computers for Security Applications" www.ip.com; Mar. 16, 2011 (Mar. 16, 2011), XP013144367, ISSN: 1533-0001 p. 1-p. 5.

* cited by examiner

*Primary Examiner* — Edward Zee

(57) ABSTRACT

A computing device includes a display, and a browser to access applications for display in a browser window. Each application is associated with a respective browser tab within the browser window. A processor is coupled to the display to display content from an application associated with a selected browser tab, and to classify the selected browser tab. The processor enables app protection to selectively block screenshots of the displayed content based on the classification of the selected browser tab.

16 Claims, 11 Drawing Sheets

CONTEXTUAL TAB AWARE APP PROTECTION

TECHNICAL FIELD

The present disclosure relates to computer systems, and more particularly, to protecting applications.

BACKGROUND

In a typical work day, users are able to access an ever-increasing amount of information through their computing devices. This information is readily accessible from a wide range of workspace resources, one category of which is applications. These applications can be SaaS apps, web apps and virtual apps.

IT administrators within an organization may implement access control for the applications. Access control is a component of data security that dictates who is allowed to access and use corporate information and resources. In addition, IT administrators may also apply app protection and other policies to safeguard the applications.

SUMMARY

A computing device includes a display, and a browser to access a plurality of applications for display in a browser window, with each application associated with a respective browser tab within the browser window. A processor is coupled to the display to display content from an application associated with a selected browser tab, and to classify the selected browser tab. The processor enables app protection to selectively block screenshots of the displayed content based on the classification of the selected browser tab.

The processor may be configured to classify the selected browser tab based on comparing an address of the application associated with the selected browser tab to an address list, with the classification being based on the address being on the address list. The address list may be received from an access control service configured to authentication a user of the computing device.

Each application may be classified as a corporate app or as a personal app, with the processor enabling app protection for the corporate apps.

The browser may comprise a browser extension configured to provide an address for the application associated with the selected browser tab to the processor, with the selected browser tab being classified based on the provided address.

Hooks may be used within the browser window to provide an address for the application associated with the selected browser tab to the processor, with the selected browser tab being classified based on the provided address.

The application associated with the selected browser tab may be accessed via a reverse proxy, with the reverse proxy providing an address for the application to the processor, and with the selected browser tab being classified based on the provided address.

An identifier file may be loaded into the selected browser tab in response to the application associated therewith being accessed, with the identifier file including a unique identifier indicating that the application is to have app protection enabled. The processor may be further configured to enable app protection after verification of the unique identifier.

The unique identifier may be verified based on comparing the unique identifier to a list of unique identifiers, with verification being based on the unique identifier being on the list.

An enablement file may be loaded into the browser in response to the browser being launched, with the enablement file configured to enable or disable app protection based on receiving a command. The processor may be further configured to send the command to the enablement file based on the classification of the selected browser tab. A default of the enablement file when loaded may be to enable app protection.

The processor may be further configured to monitor the browser tabs to detect the selected browser tab.

The browser may be configured to access the plurality of applications for display in a plurality of browser windows, with each application associated with a respective browser tab within a respective browser window. The processor may be further configured to determine which browser window includes the selected tab.

Another aspect is directed to a method comprising operating a browser to access a plurality of applications for display in a browser window, with each application associated with a respective browser tab within the browser window. Content from an application associated with a selected browser tab is displayed. The method further includes classifying the selected browser tab, and enabling app protection to selectively block screenshots of the displayed content abased on the classification of the selected browser tab.

Yet another aspect is directed to a computing device comprising a memory and a processor configured to provide an application configured to navigate to resources of a network, with the application to display content of the resources within a window of the application. A domain for the content of the resources visible in the window is identified. The window is classified based on the identified domain, and a call is initiated to executable code to block functionality to create images of the content visible in the window based on the classification of that window.

DETAILED DESCRIPTION

Figure 1:
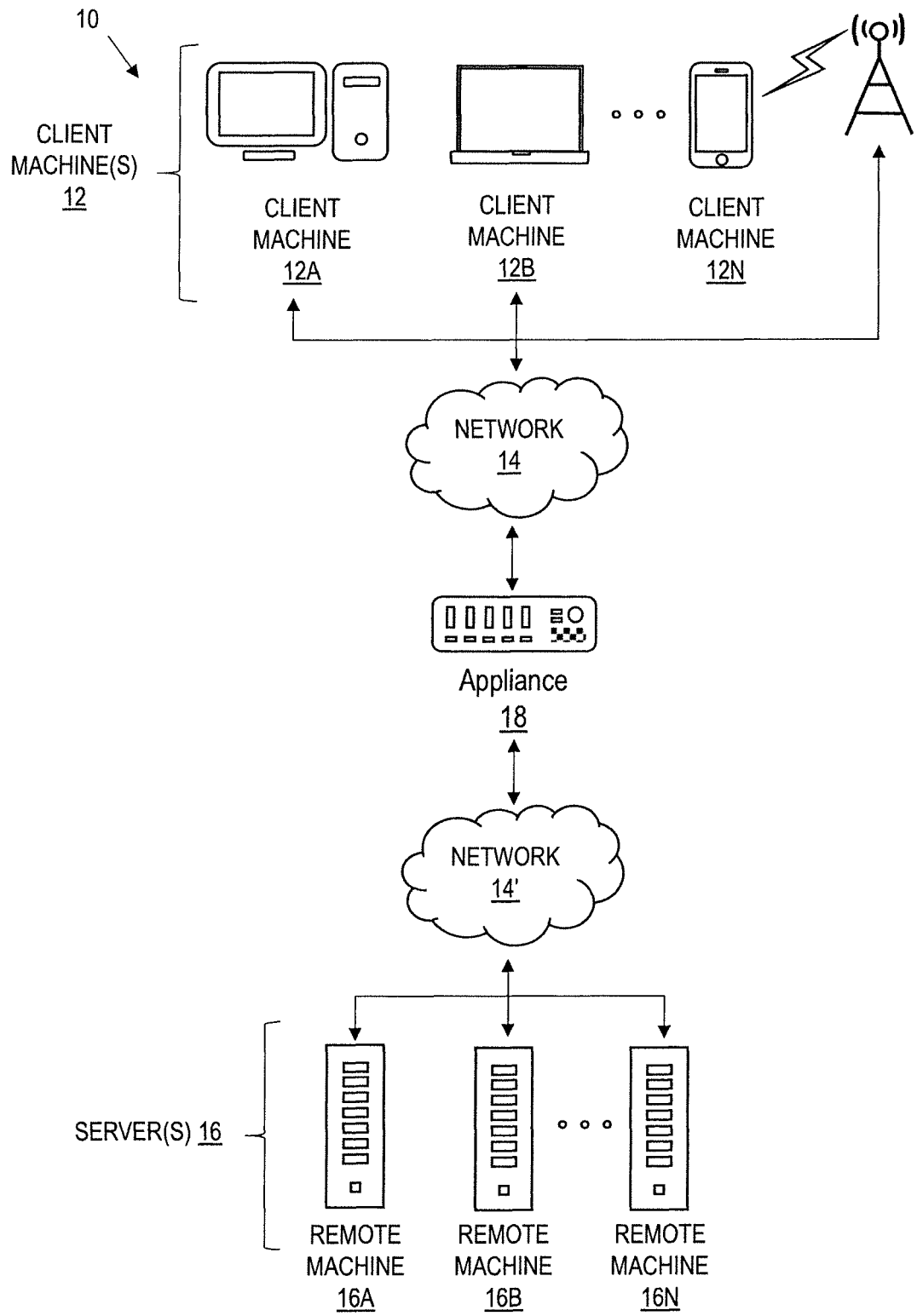
FIG. 1 is a schematic block diagram of a network environment of computing devices in which various aspects of the disclosure may be implemented.

App protection may be applied within an organization to protect applications managed by the organization. App protection can contain many features, such as anti-key logging and selectively blocking screenshots.

The managed applications may be referred to as corporate apps. Corporate apps include SalesForce, Dropbox and Slack, for example. Applications that are not managed by the organization may be referred to as personal apps. Facebook is a personal app, for example.

Selectively blocking screenshots via app protection, when enabled, prevents a user of a computing device from taking a screenshot of displayed content. A screenshot is a static image of a display of the computing device that may then be shared with others. If the user of the computing device did try to take a screenshot of the display, then a blank or shaded screen would be generated instead.

A user may use multiple browser tabs within a single browser, with individual browser tabs corresponding to an application. This allows the user to have multiple applications opened at the same time without juggling multiple browser windows. Instead, the user switches between the applications by selecting the browser tab corresponding to a desired application.

Some of the browser tabs may be used for corporate apps and the remaining browser tabs may be used for personal apps. For a user working on a facebook.com page in one of the browser tabs, app protection should not be enabled to block the user from taking a screenshot for personal use. In response to the user selecting a browser tab for a corporate app, app protection should be enabled to insure protection of data within the corporate app. Currently, when multiple browser tabs within a single browser include corporate and personal apps, then app protection is enabled for all of the applications. That is, app protection is applied on a global level, or in other words, is an all-or-nothing approach.

The techniques and teachings of the present disclosure provide contextual tab awareness so that app protection is enabled based on classification of a selected browser tab. In short, app protection can be applied on an individual basis rather than on a collective basis across all tabs of a browser as a group. Contextual tab awareness allows a user to switch between corporate and personal browser tabs within in a browser so that app protection is dynamically enabled for specific or individual tabs, such as those that include the corporate apps. This helps users such as those with Bring your own Device (BYOD) where a user may be able to take screenshots for browser tabs with personal apps but app protection features provide protection for browser tabs with corporate apps.

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

Referring initially to FIG. 1, a non-limiting network environment 10 in which various aspects of the disclosure may be implemented includes one or more client machines 12A-12N, one or more remote machines 16A-16N, one or more networks 14, 14', and one or more appliances 18 installed within the computing environment 10. The client machines 12A-12N communicate with the remote machines 16A-16N via the networks 14, 14'.

In some embodiments, the client machines 12A-12N communicate with the remote machines 16A-16N via an intermediary appliance 18. The illustrated appliance 18 is positioned between the networks 14, 14' and may also be referred to as a network interface or gateway. In some embodiments, the appliance 18 may operate as an application delivery controller (ADC) to provide clients with access to business applications and other data deployed in a data center, the cloud, or delivered as Software as a Service (SaaS) across a range of client devices, and/or provide other functionality such as load balancing, etc. In some embodiments, multiple appliances 18 may be used, and the appliance(s) 18 may be deployed as part of the network 14 and/or 14'.

The client machines 12A-12N may be generally referred to as client machines 12, local machines 12, clients 12, client nodes 12, client computers 12, client devices 12, computing devices 12, endpoints 12, or endpoint nodes 12. The remote machines 16A-16N may be generally referred to as servers 16 or a server farm 16. In some embodiments, a client device 12 may have the capacity to function as both a client node seeking access to resources provided by a server 16 and as a server 16 providing access to hosted resources for other client devices 12A-12N. The networks 14, 14' may be generally referred to as a network 14. The networks 14 may be configured in any combination of wired and wireless networks.

A server 16 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 16 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 16 may execute a remote presentation services program or other program that uses a thin-client or a remote-display protocol to capture display output generated by an application executing on a server 16 and transmit the application display output to a client device 12.

In yet other embodiments, a server 16 may execute a virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14; and a primary private network 14. Additional embodiments may include a network 14 of mobile telephone networks that use various protocols to communicate among mobile devices. For short range communications within a wireless local-area network (WLAN), the protocols may include 802.11, Bluetooth, and Near Field Communication (NFC).

Figure 2:
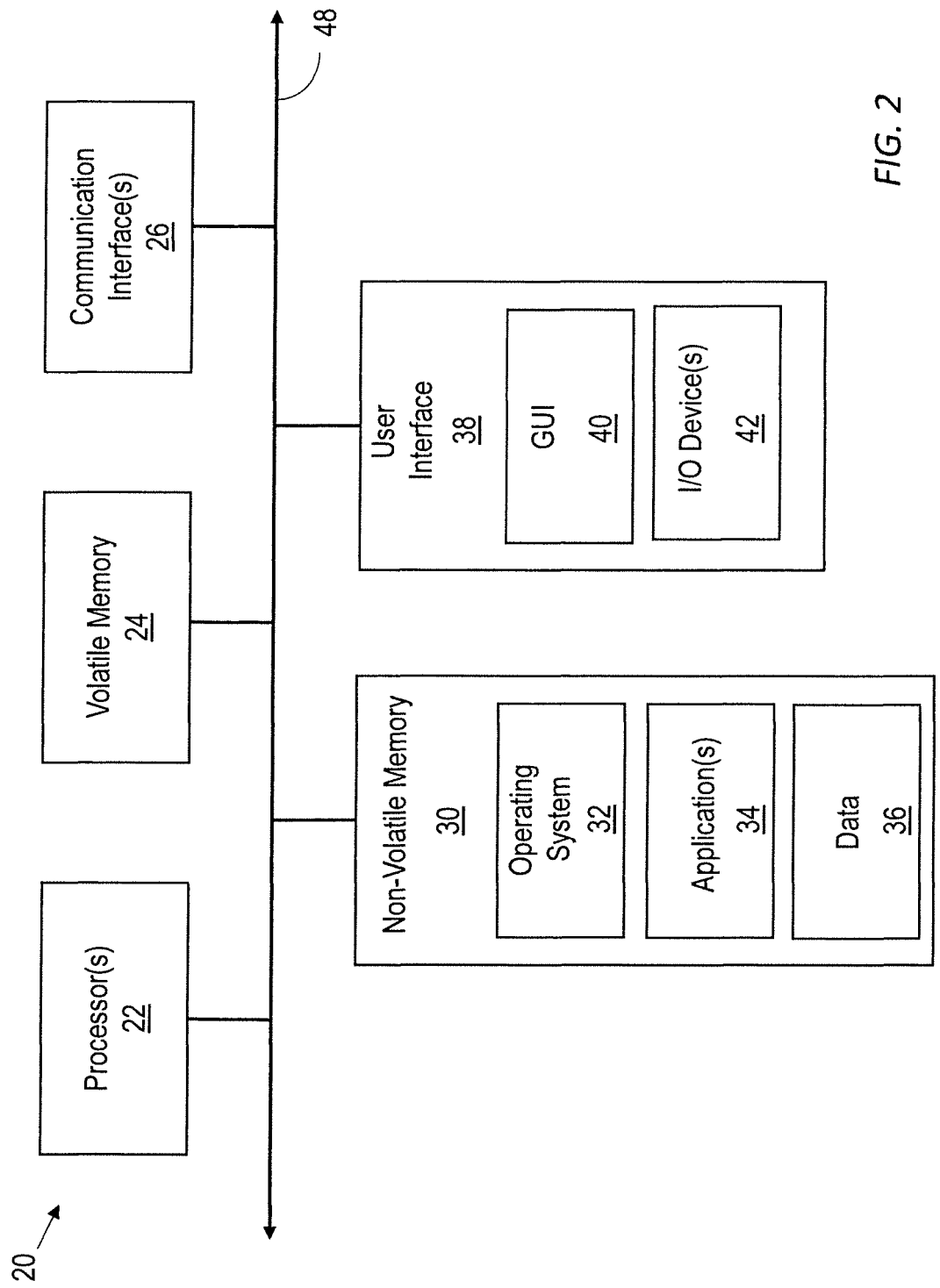
FIG. 2 is a schematic block diagram of a computing device useful for practicing an embodiment of the client machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a graphical user interface (GUI) 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Florida ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
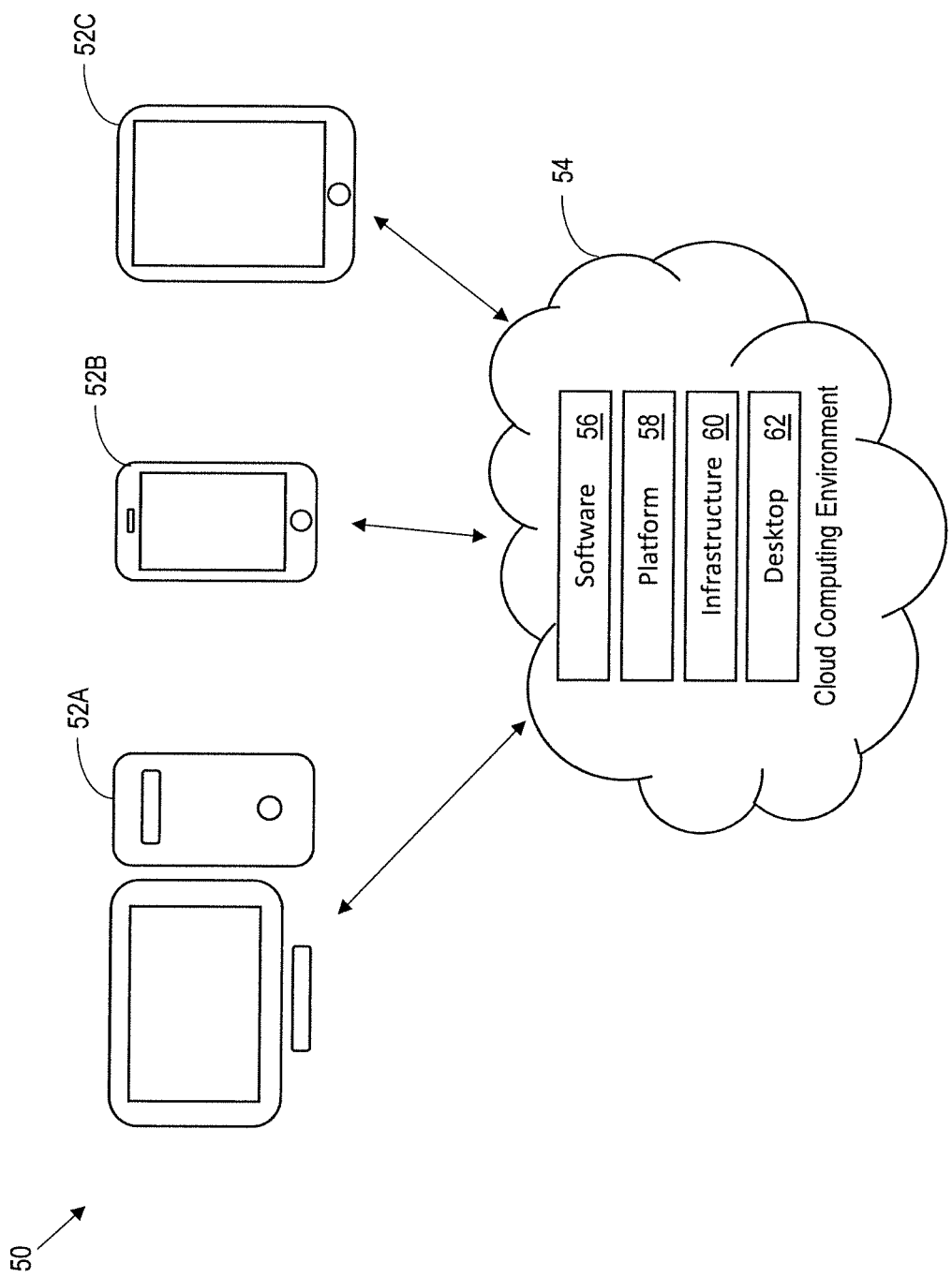
FIG. 3 is a schematic block diagram of a cloud computing environment in which various aspects of the disclosure may be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment 50 may provide cloud-based delivery of different types of cloud computing services, such as Software as a service (SaaS) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft ONEDRIVE provided by Microsoft Corporation, Google Drive provided by Google Inc., or Apple ICLOUD provided by Apple Inc. of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud is one example of a DaaS delivery platform. DaaS delivery platforms may be hosted on a public cloud computing infrastructure such as AZURE CLOUD from Microsoft Corporation of Redmond, Washington (herein "Azure"), or AMAZON WEB SERVICES provided by Amazon.com, Inc., of Seattle, Washington (herein "AWS"), for example. In the case of Citrix Cloud, Citrix Workspace app may be used as a single-entry point for bringing apps, files and desktops together (whether on-premises or in the cloud) to deliver a unified experience.

Figure 4:
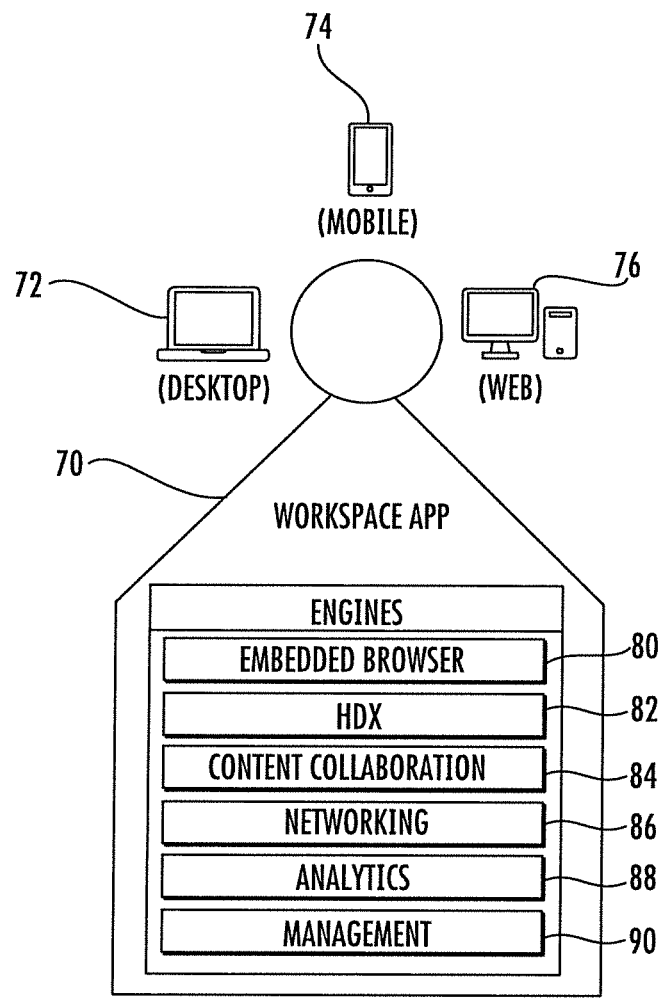
FIG. 4 is a schematic block diagram of desktop, mobile and web based devices operating a workspace app in which various aspects of the disclosure may be implemented.

The unified experience provided by the Citrix Workspace app will now be discussed in greater detail with reference to FIG. 4. The Citrix Workspace app will be generally referred to herein as the workspace app 70. The workspace app 70 is how a user gets access to their workspace resources, one category of which is applications. These applications can be SaaS apps, web apps or virtual apps. The workspace app 70 also gives users access to their desktops, which may be a local desktop or a virtual desktop. Further, the workspace app 70 gives users access to their files and data, which may be stored in numerous repositories. The files and data may be hosted on Citrix ShareFile, hosted on an on-premises network file server, or hosted in some other cloud storage provider, such as Microsoft OneDrive or Google Drive Box, for example.

To provide a unified experience, all of the resources a user requires may be located and accessible from the workspace app 70. The workspace app 70 is provided in different versions. One version of the workspace app 70 is an installed application for desktops 72, which may be based on Windows, Mac or Linux platforms. A second version of the workspace app 70 is an installed application for mobile devices 74, which may be based on iOS or Android platforms. A third version of the workspace app 70 uses a hypertext markup language (HTML) browser to provide a user access to their workspace environment. The web version of the workspace app 70 is used when a user does not want to install the workspace app or does not have the rights to install the workspace app, such as when operating a public kiosk 76.

Each of these different versions of the workspace app 70 may advantageously provide the same user experience. This advantageously allows a user to move from client device 72 to client device 74 to client device 76 in different platforms and still receive the same user experience for their workspace. The client devices 72, 74 and 76 are referred to as endpoints.

As noted above, the workspace app 70 supports Windows, Mac, Linux, iOS, and Android platforms as well as platforms with an HTML browser (HTML5). The workspace app 70 incorporates multiple engines 80-90 allowing users access to numerous types of app and data resources. Each engine 80-90 optimizes the user experience for a particular resource. Each engine 80-90 also provides an organization or enterprise with insights into user activities and potential security threats.

An embedded browser engine 80 keeps SaaS and web apps contained within the workspace app 70 instead of launching them on a locally installed and unmanaged browser. With the embedded browser, the workspace app 70 is able to intercept user-selected hyperlinks in SaaS and web apps and request a risk analysis before approving, denying, or isolating access.

A high definition experience (HDX) engine 82 establishes connections to virtual browsers, virtual apps and desktop sessions running on either Windows or Linux operating systems. With the HDX engine 82, Windows and Linux resources run remotely, while the display remains local, on the endpoint. To provide the best possible user experience, the HDX engine 82 utilizes different virtual channels to adapt to changing network conditions and application requirements. To overcome high-latency or high-packet loss networks, the HDX engine 82 automatically implements optimized transport protocols and greater compression algorithms. Each algorithm is optimized for a certain type of display, such as video, images, or text. The HDX engine 82 identifies these types of resources in an application and applies the most appropriate algorithm to that section of the screen.

For many users, a workspace centers on data. A content collaboration engine 84 allows users to integrate all data into the workspace, whether that data lives on-premises or in the cloud. The content collaboration engine 84 allows administrators and users to create a set of connectors to corporate and user-specific data storage locations. This can include OneDrive, Dropbox, and on-premises network file shares, for example. Users can maintain files in multiple repositories and allow the workspace app 70 to consolidate them into a single, personalized library.

A networking engine 86 identifies whether or not an endpoint or an app on the endpoint requires network connectivity to a secured backend resource. The networking engine 86 can automatically establish a full VPN tunnel for the entire endpoint device, or it can create an app-specific p-VPN connection. A p-VPN defines what backend resources an application and an endpoint device can access, thus protecting the backend infrastructure. In many instances, certain user activities benefit from unique network-based optimizations. If the user requests a file copy, the workspace app 70 can automatically utilize multiple network connections simultaneously to complete the activity faster. If the user initiates a VoIP call, the workspace app 70 improves its quality by duplicating the call across multiple network connections. The networking engine 86 uses only the packets that arrive first.

An analytics engine 88 reports on the user's device, location and behavior, where cloud-based services identify any potential anomalies that might be the result of a stolen device, a hacked identity or a user who is preparing to leave the company. The information gathered by the analytics engine 88 protects company assets by automatically implementing counter-measures.

A management engine 90 keeps the workspace app 70 current. This not only provides users with the latest capabilities, but also includes extra security enhancements. The workspace app 70 includes an auto-update service that routinely checks and automatically deploys updates based on customizable policies.

Figure 5:
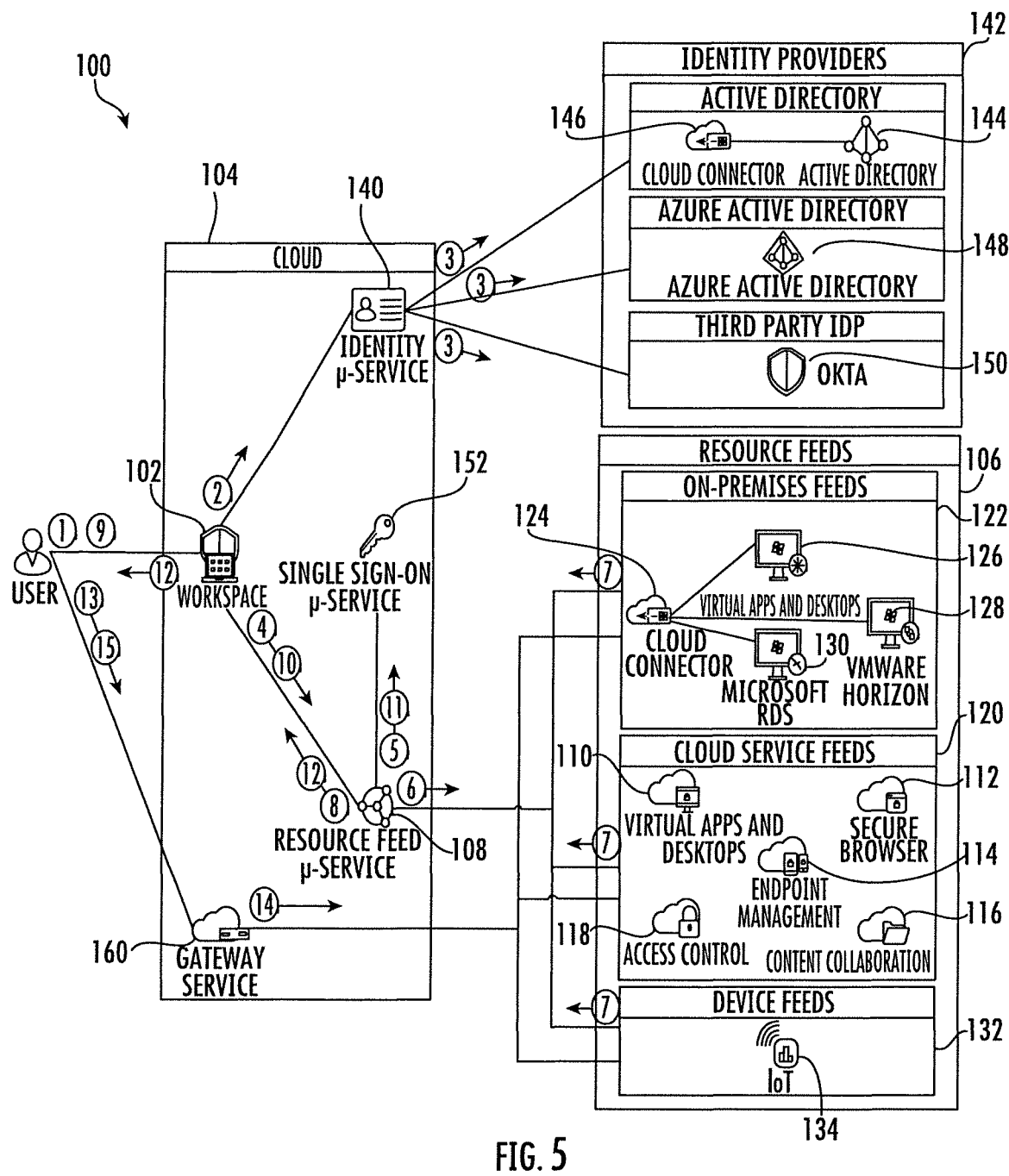
FIG. 5 is a schematic block diagram of a workspace network environment of computing devices in which various aspects of the disclosure may be implemented.

Referring now to FIG. 5, a workspace network environment 100 providing a unified experience to a user based on the workspace app 70 will be discussed. The desktop, mobile and web versions of the workspace app 70 all communicate with the workspace experience service 102 running within the Citrix Cloud 104. The workspace experience service 102 then pulls in all the different resource feeds via a resource feed micro-service 108. That is, all the different resources from other services running in the Citrix Cloud 104 are pulled in by the resource feed micro-service 108. The different services may include a virtual apps and desktop service 110, a secure browser service 112, an endpoint management service 114, a content collaboration service 116, and an access control service 118. Any service that an organization or enterprise subscribes to are automatically pulled into the workspace experience service 102 and delivered to the user's workspace app 70.

In addition to cloud feeds 120, the resource feed micro-service 108 can pull in on-premises feeds 122. A cloud connector 124 is used to provide virtual apps and desktop deployments that are running in an on-premises data center. Desktop virtualization may be provided by Citrix virtual apps and desktops 126, Microsoft RDS 128 or VMware Horizon 130, for example. In addition to cloud feeds 120 and on-premises feeds 122, device feeds 132 from Internet of Thing (IoT) devices 134, for example, may be pulled in by the resource feed micro-service 108. Site aggregation is used to tie the different resources into the user's overall workspace experience.

The cloud feeds 120, on-premises feeds 122 and device feeds 132 each provides the user's workspace experience with a different and unique type of application. The workspace experience can support local apps, SaaS apps, virtual apps, and desktops browser apps, as well as storage apps. As the feeds continue to increase and expand, the workspace experience is able to include additional resources in the user's overall workspace. This means a user will be able to get to every single application that they need access to.

Still referring to the workspace network environment 20, a series of events will be described on how a unified experience is provided to a user. The unified experience starts with the user using the workspace app 70 to connect to the workspace experience service 102 running within the Citrix Cloud 104, and presenting their identity (event 1). The identity includes a user name and password, for example.

The workspace experience service 102 forwards the user's identity to an identity micro-service 140 within the Citrix Cloud 104 (event 2). The identity micro-service 140 authenticates the user to the correct identity provider 142 (event 3) based on the organization's workspace configuration. Authentication may be based on an on-premises active directory 144 that requires the deployment of a cloud connector 146. Authentication may also be based on Azure Active Directory 148 or even a third party identity provider 150, such as Citrix ADC or Okta, for example.

Once authorized, the workspace experience service 102 requests a list of authorized resources (event 4) from the resource feed micro-service 108. For each configured resource feed 106, the resource feed micro-service 108 requests an identity token (event 5) from the single-sign micro-service 152.

The resource feed specific identity token is passed to each resource's point of authentication (event 6). On-premises resources 122 are contacted through the Citrix Cloud Connector 124. Each resource feed 106 replies with a list of resources authorized for the respective identity (event 7).

The resource feed micro-service 108 aggregates all items from the different resource feeds 106 and forwards (event 8) to the workspace experience service 102. The user selects a resource from the workspace experience service 102 (event 9).

The workspace experience service 102 forwards the request to the resource feed micro-service 108 (event 10). The resource feed micro-service 108 requests an identity token from the single sign-on micro-service 152 (event 11). The user's identity token is sent to the workspace experience service 102 (event 12) where a launch ticket is generated and sent to the user.

The user initiates a secure session to a gateway service 160 and presents the launch ticket (event 13). The gateway service 160 initiates a secure session to the appropriate resource feed 106 and presents the identity token to seamlessly authenticate the user (event 14). Once the session initializes, the user is able to utilize the resource (event 15). Having an entire workspace delivered through a single access point or application advantageously improves productivity and streamlines common workflows for the user.

Figure 6:
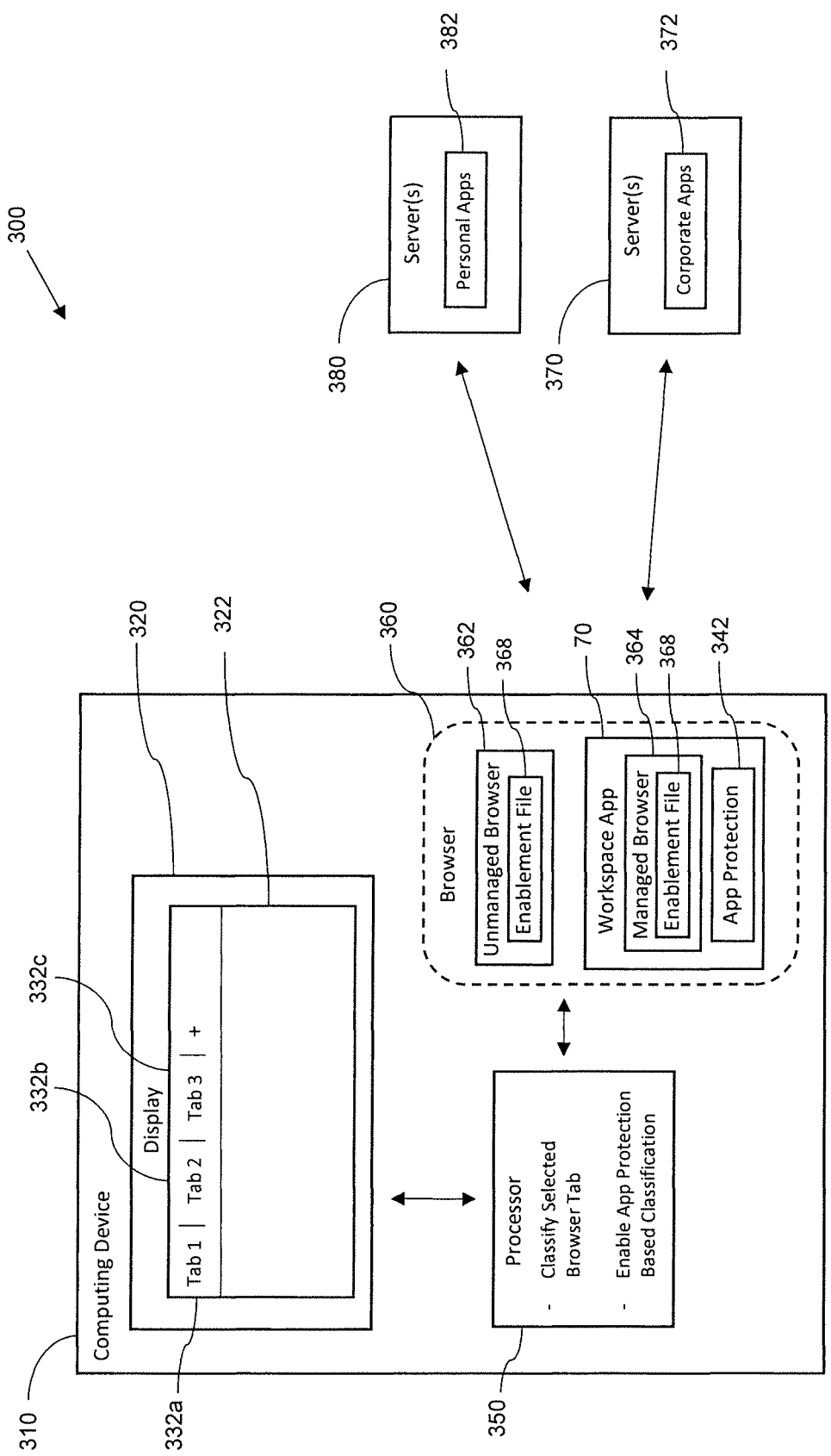
FIG. 6 is a schematic block diagram of a computing device providing app protection in which various aspects of the disclosure may be implemented.

Referring now to FIG. 6, the illustrated computer system 300 includes a computing device 310 providing app protection 342. The computing device 310 may operate within an organization, and the app protection 342 is to be applied to protect applications managed by the organization. As an example, the organization may be configured to operate within the workspace network environment 100 as discussed above.

Applications that are managed by the organization may be referred to as corporate apps 372. Corporate apps 372 include SaaS apps, web apps and virtual apps. Example corporate apps 372 include SalesForce, Dropbox and Slack, for example. Applications that are not managed by the organization may be referred to as personal apps 382. Facebook is a personal app, for example.

Even though a single server 370 is shown for the corporate apps 372, multiple severs 370 are typically used to provide the corporate apps 372. Similarly, even though a single server 380 is shown for the personal apps 382, multiple severs 380 are typically used to provide the personal apps 382.

The computing device 310 includes a display 320, and a browser 360 configured to access the corporate and personal apps 372, 382 for display within a browser window 322. Applications 372, 382 may be associated with a respective browser tab 332a-332c within the browser window 322. The respective browser tabs 332a-332c may be generally referred to as browser tabs 332.

A processor 350 is coupled to the display 320 and is configured to display content from an application associated with a selected browser tab 332, classify the selected browser tab 332 as corporate or personal, and enable app protection 342 to selectively block screenshots of the displayed content based on the classification of the selected browser tab 332.

For example, browser tabs 332a and 332c are associated with the corporate apps 372, and browser tab 332b is associated with the personal apps 382. In response to the user of the computing device 310 selecting browser tab 332a or 332c, app protection 342 is enabled. In response to the user selecting browser tab 332b, app protection 342 is not enabled.

Contextual tab awareness allows a user to switch between browser tabs 332a, 332b, 332c for corporate and personal apps 372, 382 within the same browser window 322 so that app protection 342 is dynamically applied to the corporate apps 372 based on classification of the selected browser tab 332.

App protection 342 is setup on the computing device 310, and is generally within an application, such as the workspace app 70, as discussed above. The workspace app 70 is how a user gets access to their workspace resources, one category of which is applications.

The browser 360 may be an unmanaged browser 362 or a managed browser 364. Typically, both browser types will be on the computing device 310 although only one of the browsers is needed to access the corporate and personal apps 372, 382.

For the managed browser 364, the source code is modified to add functionality to dynamically enable app protection 342. The added functionality is provided by an enablement file 368 included within the browser process when the managed browser 364 is launched. The enablement file 368 may also be referred to as an entryprotect.dll file.

The enablement file 368 is configured to enable or disable app protection 342 based on receiving a command. The command is sent by the processor 350 executing app protection 342 within the workspace app 70. Prior to receiving the command, a default of the enablement file 368 when loaded is to enable app protection. The command will either be to enable app protection 342 or to disable app protection 342. Since the default is to enable app protection 342, the command to enable app protection 342 keeps app protection enabled. Alternatively, the default may be to disable app protection 342.

Without the enablement file 368, the managed browser 364 supported app protection but on a global level. That is, if the managed browser 364 is used to open a browser tab which has app protection enabled, app protection is also enabled for any other browser tabs opened within the browser, even if one of the browser tabs is associated with a personal app 382. The enablement file 368 now makes app protection 342 more contextual within the managed browser 364.

An example managed browser is a Chromium browser. The managed browser 364 is embedded within another application, such as the workspace app 70. The managed browser 364 determines the URL or web address for applications accessed via the managed browser 364. The URL is then compared to a URL list of applications where app protection 342 is to be enabled.

The URL list may be provided by an access control service, for example, to the workspace app 70. Access control is a component of data security that dictates who is allowed to access and use corporate information and resources. The access control service authenticates a user of the computing device 310 and provides policies to the processor 350. In response to classification of a browser tab 332 based on its URL, a generated command causes the enablement file 368 to dynamically enable app protection 342 for the corporate apps 372 but not for the personal apps 382.

Example unmanaged browsers 362 include Chrome developed by Google, Firefox developed by Mozilla, and Edge developed by Microsoft. The unmanaged browser 362 is not controlled by the workspace app 70 since the source code is a closed source software framework and cannot be modified.

The enablement file 368 is loaded in the browser process when the unmanaged browser 362 is launched. As noted above, the enablement file 368 is configured to enable or disable app protection 342 based on the generated command. Before the command is sent, the selected browser tab 332 is to be classified. As will be discussed in greater detail below, different techniques may be used with the unmanaged browser 362 to classify a browser tab 332 as personal or corporate.

Figure 7:
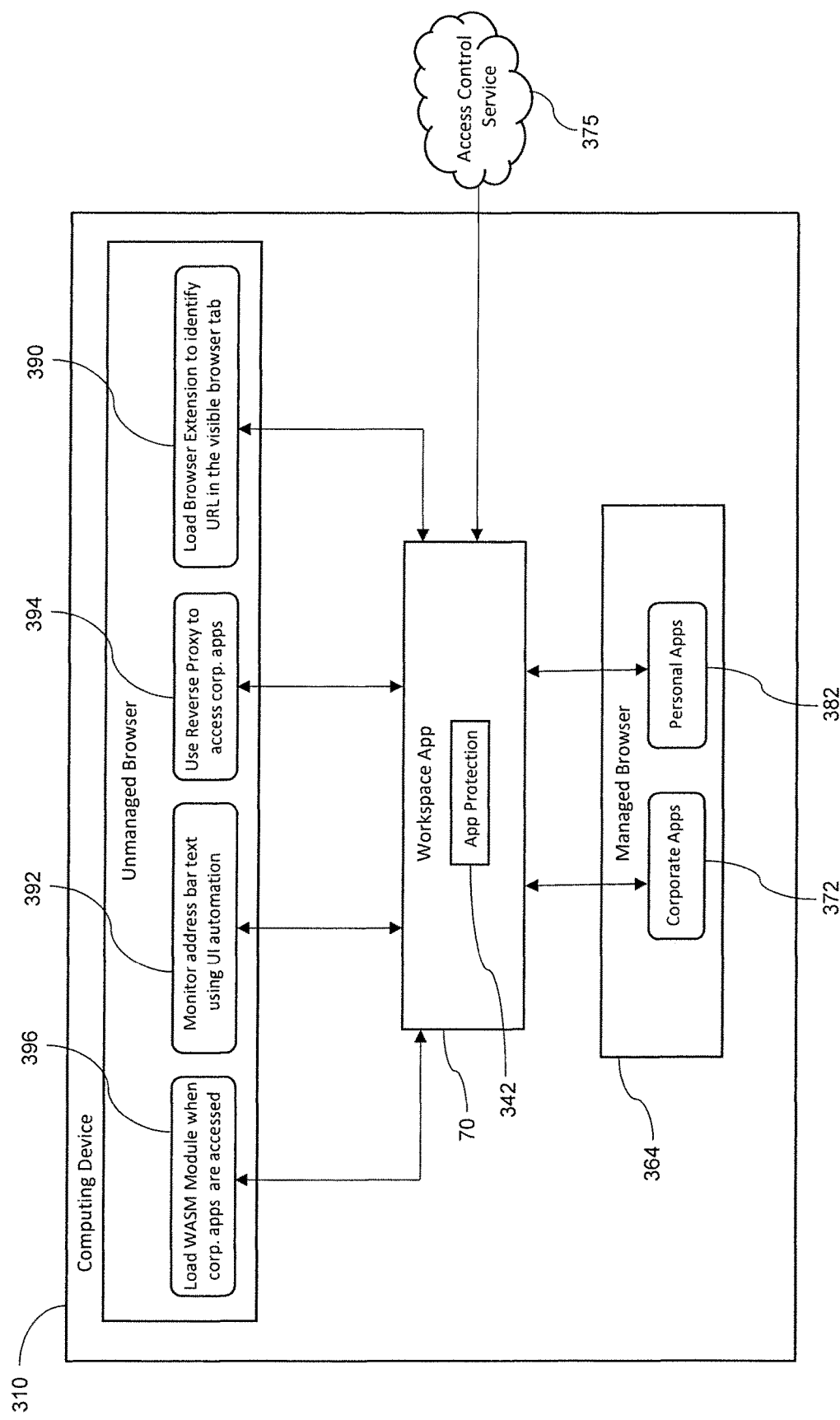
FIG. 7 is a schematic block diagram of the computing device illustrated in FIG. 6 showing different techniques used to classify browser tabs.

Referring now to FIG. 7, the different techniques that may be used to classify a browser tab 332 within an unmanaged browser 362 include the following: load an executable code or a browser extension 390 to identify URL in the visible browser tab, use a reverse proxy 394 for accessing corporate apps 372, use UI automation 392 to monitor address bar text in the browser tabs 332, and load a WebAssembly Module 396 when corporate apps 372 are being accessed.

The browser extension technique 390 is loaded by the workspace app 70 into the unmanaged browser 362 at startup of the unmanaged browser 362. The browser extension 390 is configured to determine what URL is currently being accessed by the browser tabs 332 within the browser window 322, and to report or otherwise communicate this to the workspace app 70. The URL may also be referred to as an address or domain representing the application being accessed.

The workspace app 70 compares the URL to a URL list of applications where app protection 342 is to be enabled. The URL list may be provided by the access control service 385, as discussed above, for example.

The browser extension 390 includes JavaScript, which allows the browser extension 390 to communicate with the workspace app 70. In addition, APIs are included within the browser extension 390 to listen for events (such as URL changes or a tab/window in focus or not) and look for URLs being accessed. This allows the workspace app 70 to know what browser tab 332 is visible or otherwise within the foreground of the display 320, even if the user is quickly switching to other browser tabs 332 within the browser window 322.

The UI automation technique 392 is to monitor browser tabs 332 (e.g., an address bar in the browser tabs 332). This technique may be used as an alternative to the browser extension technique 390.

UI automation includes hooking the browser window 322 to provide text within the address bar to the workspace app 70. The text is used by the workspace app 70 to determine a URL for the application associated with the selected browser tab. The selected browser tab is then classified by the workspace app 70 based on the provided text.

Instead of using hooks within the browser window 322, UI automation can also include the use of optical character recognition (OCR) to provide text within the browser tabs 332 (e.g., text within an address bar) to the workspace app 70. As above, the text is used by the workspace app 70 to determine a URL for the application associated with the selected browser tab. The selected browser tab is then classified by the workspace app 70 based on the provided text.

The reverse proxy technique 394 involves the use of a gateway to access the corporate apps 372. This technique may be used in combination with the browser extension technique 390 or the UI automation technique 392.

Instead of accessing a corporate app 372 directly, such as through web.app.com, for example, the corporate app 372 is accessed through the gateway. The corporate app 372 may be accessed through gateway.com/target=web.app.com, for example. Traffic between the computing device 310 and the server 370 providing the corporate app 372 flows through the gateway.

Since the gateway is under control of the organization, the gateway is configured to notify the workspace app 70 when a corporate app 372 is being accessed, and to provide the URL of the application being accessed. The workspace app 70 may receive the URL via a back channel to the gateway. The selected browser tab is then classified by the workspace app 70 based on the provided URL.

The WASM Module technique 396 involves loading a WASM Module into a browser tab 332 in response to a corporate app 372 being accessed. This technique may be used in combination with the browser extension technique 390, the UI automation technique 392, or the reverse proxy technique 394.

The WASM Module, also known as a WebAssembly Module, is a dll (data link library) or binary file loaded into a browser tab 332 in response to the corporate app 372 being accessed. The WASM Module may also be referred to as an identifier file, and includes a unique identifier used to identify the corporate app 372 being accessed.

The WASM Module is loaded when corporate apps 372 are accessed, and is not loaded when personal apps 382 are accessed. This technique is used when the corporate apps 372 are published corporate apps 372. Published corporate apps 372 are published by the organization in which the computing device 310 is operating, and are represented on the user's desktop as icons. The published corporate apps 372 function as if they were installed locally on the computing device 310, but instead, are installed at the server 370.

Individual published corporate apps 372 has an identifier (e.g., a unique identifier) associated therewith. The identifier in WASM modules indicates that the application being accessed is to have app protection enabled. In response to the WASM Module being loaded into the browser tab 332, the workspace app 70 makes a call to the WASM module in order to obtain the identifier.

The workspace app 70 enables app protection 342 after verification of the identifier. The identifier may be dynamically generated and is a unique thumbprint or signature that needs to be checked before the application being accessed is classified as a corporate app 372. The identifier may be verified based on comparing the identifier to a list of identifiers, with verification being based on the identifier being on the list.

Figure 8:
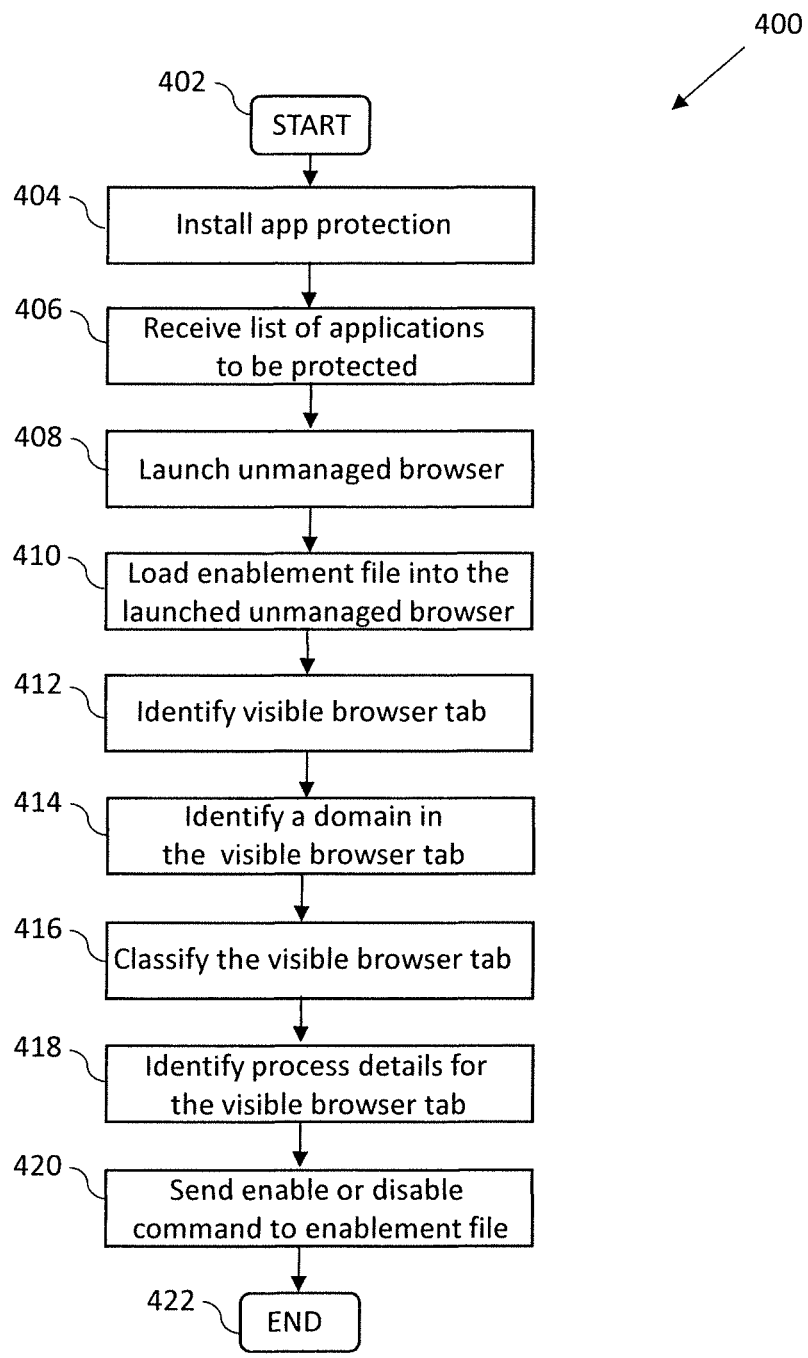
FIG. 8 is a detailed flow diagram for providing app protection using the unmanaged browser in the computing device illustrated in FIG. 6.

Referring now to the flow diagram 400 in FIG. 8, a detailed flow diagram for providing app protection using the unmanaged browser 362 in the computing device 310 will be discussed. From the start (Block 402), the method includes installing app protection 342 at Block 404 in the workspace app 70. If app protection 342 is not installed, then the user will be prompted to install app protection 342.

A list of applications to be protected is received at Block 406. The list of applications to be protected may be automatically generated based on the corporate apps 372 being published. As noted above, published corporate apps 372 are published by the organization in which the computing device 310 is operating, and are represented on the user's desktop as icons. Alternatively, the list of applications to be protected may be generated by an administrator, with the list then being provided by the access control service 375 to the workspace app 70 after authentication of the user.

The workspace app 70 makes a request to the access control service 375, after authentication of the user, to get a policy document which includes the list of applications to be protected. This is done without user input. The corporate apps 372 on the list are identified by their URL addresses.

The unmanaged browser 362 is launched at Block 408, and this causes an enablement file 368 to be loaded in the browser process at Block 410. As noted above, the enablement file 368 is configured to enable or disable app protection 342 based on receiving a command. The enablement file 368, also referred to as an entryprotect.dll file, opens a communication channel for the workspace app 70 to send the command to the enablement file 368.

The visible browser tab 332, which corresponds to the selected browser tab, is identified at Block 412. Identifying the visible browser tab 332 may be performed using the browser extension as discussed above. The browser extension uses event handlers to determine when the user switches between browser tabs 332 as well as monitoring visible events. Alternatively, the visible browser tab 332 may be identified using UI automation as discussed above. The UI automation uses browser window events to detect when a browser process window is visible.

A domain or address of the visible browser tab 332 is identified at Block 414. As discussed above in greater detail, different techniques may be used with the unmanaged browser 362 to identify a browser tab 332 so that the browser tab may be classified as personal or corporate.

Figure 9:
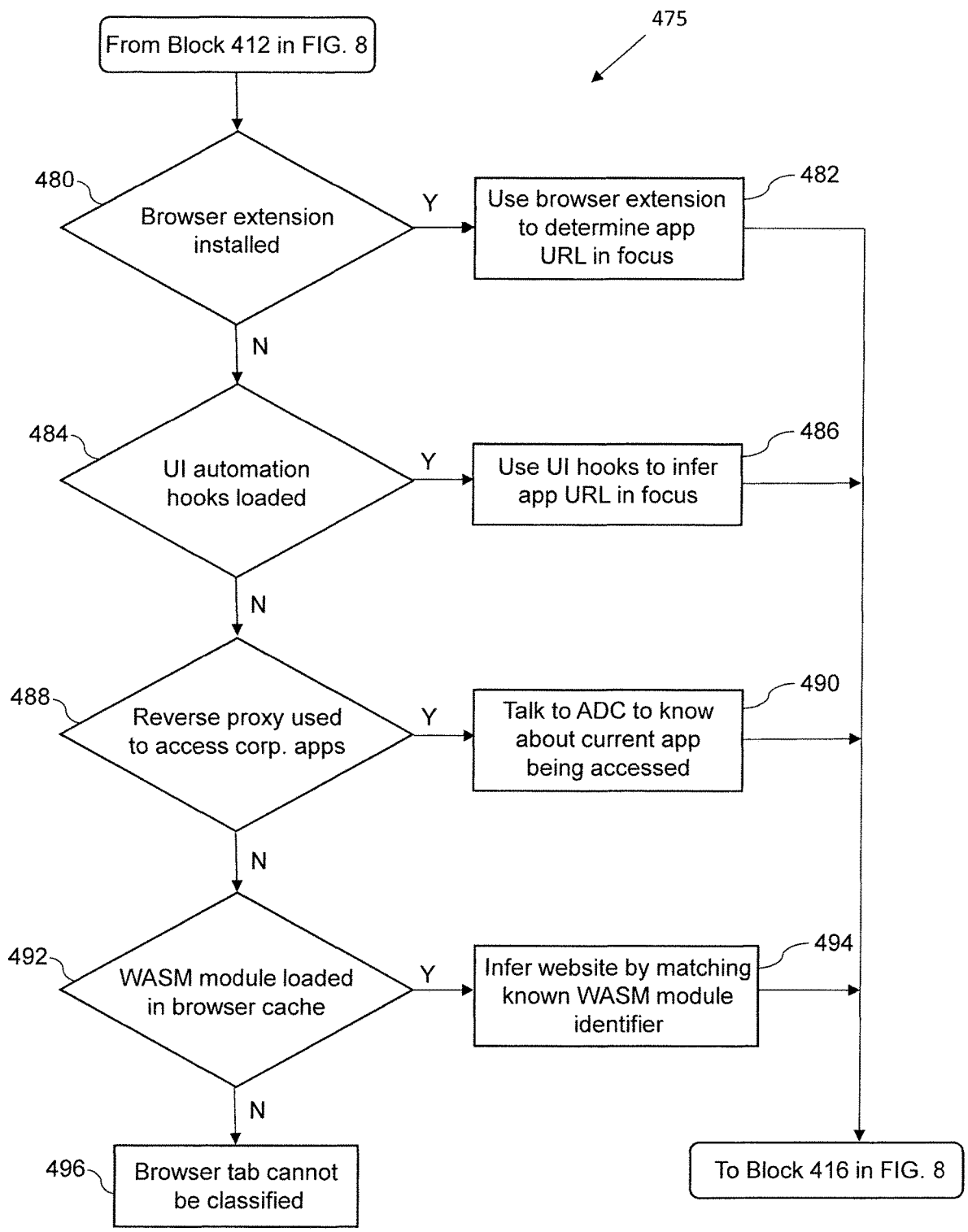
FIG. 9 is a subroutine prioritizing the techniques used to identify a domain in the visible browser tab in the flow diagram in FIG. 8.

A subroutine 475 using the different techniques will be discussed in reference to FIG. 9. Since one technique is needed to identify a domain in the visible browser tab 332, all of the techniques may be prioritized within the subroutine 475 for when multiple techniques are implemented within the computing device 310.

Starting with Block 480, a determination is made on if a browser extension 390 has been installed. If yes, then the browser extension 390 is used to exactly determine the app URL in focus at Block 482. Then the subroutine 475 continues to Block 416 for the visible browser tab 332 to be classified as personal or corporate.

If a browser extension 390 is not installed, then a determination is made at Block 484 on if UI automation hooks 392 have been installed. If yes, then the UI hooks 392 are used to infer the app URL in focus at Block 486. Then the subroutine 475 continues to Block 416 for the visible browser tab 332 to be classified as personal or corporate.

If UI automation hooks 392 have not been installed, then a determination is made at Block 488 on if a reverse proxy 394 has been used to access a corporate app 372. If yes, then communications is established with a controller to know about the current app being accessed. An example controller is an application delivery controller (ADC) provided by Citrix Corp. The controller improves the delivery speed and quality of applications to an end user. Then the subroutine 475 continues to Block 416 for the visible browser tab 332 to be classified as personal or corporate.

If a reverse proxy 394 has not been used, then a determination is made at Block 492 on if a WASM module 396 has been loaded in the browser cache. If yes, then the website in the visible tab 332 is inferred by matching the know WASM module identifier (i.e., a hash) to a list of know identifiers. Then the subroutine 475 continues to Block 416 in response to a match where the visible browser tab 332 is classified as personal or corporate. If a WASM module 396 has not been loaded, then the subroutine continues to Block 496 where the browser tab 332 cannot be classified.

Referring back to FIG. 8, process details for the visible browser tab 332 are identified at Block 418. The process details are used to identify the browser window with the visible browser tab 332. For instance, multiple browser windows 322 may be opened by the unmanaged browser 362 to access the applications 372, 382. Each application 372, 382 is associated with a respective browser tab 322 within a respective browser window 322.

Since individual browser windows 322 have the enablement file 368, the process details are used to determine which browser window 322 includes the selected browser tab 332. Each browser tab 332 may have its own process, so in implementations, the enablement file 368 is loaded in each of the processes associated with the browser tabs 332a-332c. This allows the command to enable or disable app protection 342 to be sent to the enablement file 368 for the browser window 322 with the visible browser tab 332.

The browser extension may be used to determine the process details using getProcessidForTab, which is code loaded into the browser extension. Alternatively, the process details may be identified using UI automation as discussed above. The UI automation uses hooks in browser window events to fetch the process details.

The workspace app 70 sends the command at Block 420 to enable or disable app protection 342. The command is received by the enablement file 368 in the browser window 322 with the visible browser tab 332. The method ends at Block 422.

Figure 10:
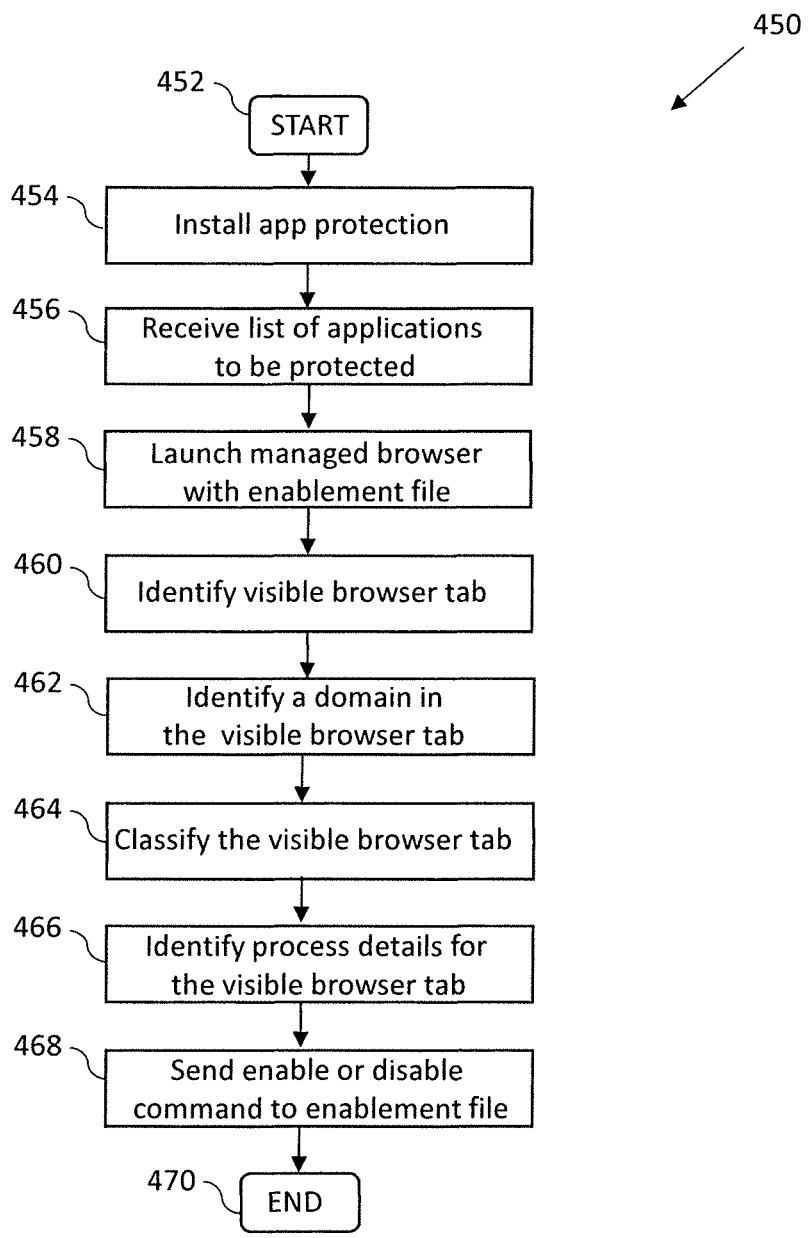
FIG. 10 is a detailed flow diagram for providing app protection using the managed browser in the computing device illustrated in FIG. 6.

Referring now to the flow diagram 450 in FIG. 10, a detailed flow diagram 450 for providing app protection using the managed browser 362 in the computing device 310 will be discussed. From the start (Block 452), the method includes installing app protection 342 at Block 454 in the workspace app 70.

A list of applications to be protected is received at Block 456. As discussed above, the list of applications to be protected may be automatically generated based on the corporate apps 372 being published, or may be generated by an administrator, with the list then being provided by the access control service 375 to the workspace app 70 after authentication of the user.

The workspace app 70 makes a request to the access control service 375, after authentication of the user, to get a policy document which includes the list of applications to be protected. This is done without user input. The corporate apps 372 on the list are identified by their URL addresses.

The managed browser 364 with the enablement file 368 is launched at Block 458. The visible browser tab 332, which corresponds to the selected browser tab, is identified at Block 460. Identifying the visible browser tab 332 may be performed using event handlers to determine when the user switches between browser tabs 332 as well as monitoring visible events.

A domain or address of the visible browser tab 332 is identified at Block 462. This is based on the managed browser 364 identifying a URL in the browser tab 332 so that the browser tab 332 may be classified as personal or corporate.

Process details for the visible browser tab 332 are identified at Block 466. The process details are used to identify the browser window with the visible browser tab 332. For instance, multiple browser windows 322 may be opened by the managed browser 364 to access the applications 372, 382. Each application 372, 382 is associated with a respective browser tab 322 within a respective browser window 322.

Since individual browser windows 322 have the enablement file 368, the process details are used to determine which browser window 322 includes the selected browser tab 332. As noted above, each browser tab 332 may have its own process, which means the enablement file 368 is loaded in each of the processes associated with the browser tabs 332a-332c. This allows the command to enable or disable app protection 342 to be sent by workspace app 70 at Block 468 to the enablement file 368 for the browser window 322 with the visible browser tab 332. The command is received by the enablement file 368 in the browser window 322 with the visible browser tab 332. The method ends at Block 470.

Figure 11:
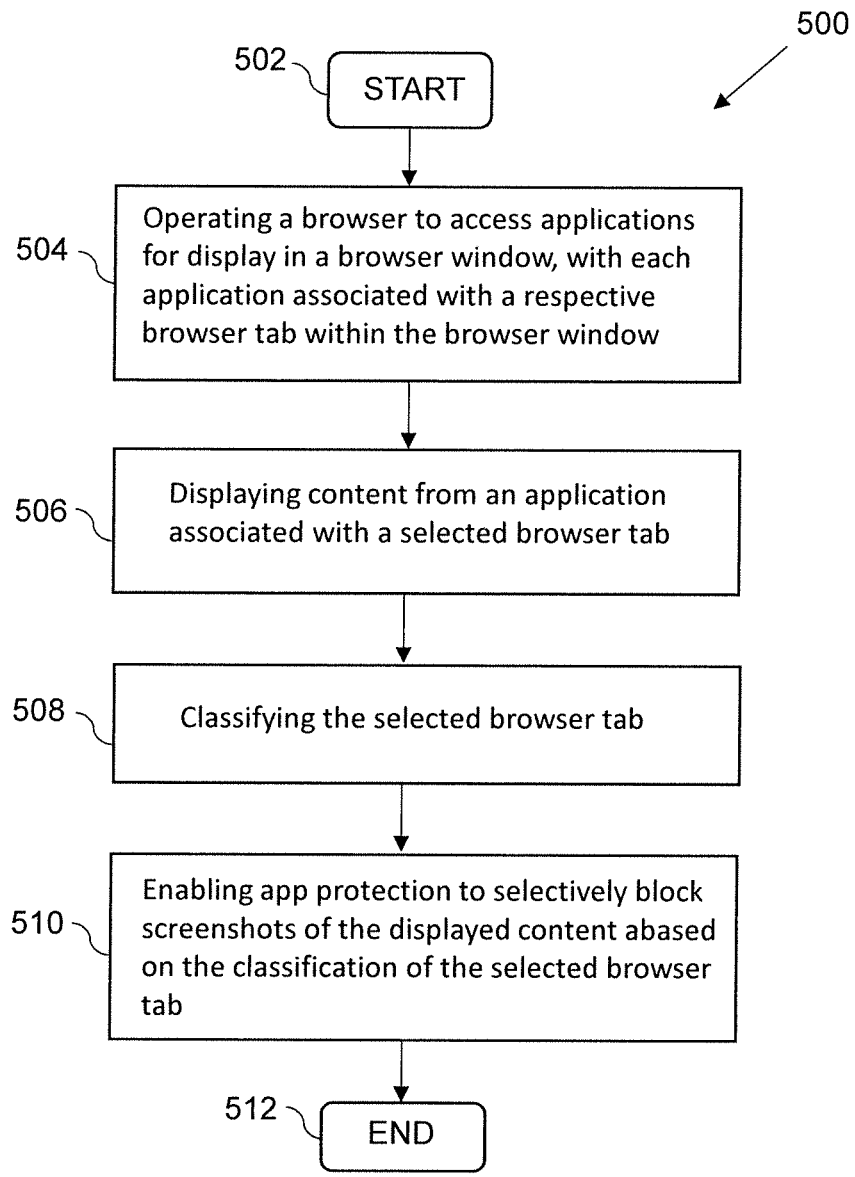
FIG. 11 is a high level flow diagram for providing app protection using the computing device illustrated in FIG. 6.

Referring now to the flow diagram 500 in FIG. 11, a high level method for applying app protection 342 will be discussed. From the start (Block 502), the method includes operating a browser 360 at Block 504 to access applications 372, 382 for display in a browser window 322. Individual applications are associated with or otherwise displayed with a respective browser tab 332 within the browser window 322. Content from an application associated with a selected browser tab 332 is displayed at Block 506. The method further includes classifying the selected browser tab 332 at Block 508, and enabling app protection 342 at Block 510 to selectively block screenshots of the displayed content abased on the classification of the selected browser tab 332. The method ends at Block 512.

Various enhancements may be provided to the contextual tab aware app protection as discussed above. For example, when a browser tab 332 is classified as corporate, a displayed page from the corporate app 372 not having sensitive content may result in app protection being disabled. In response to another displayed page from the corporate app 372 having sensitive content, then app protection 342 is enabled.

As another example, visible browser tab classification as discussed above may be used to provide contextual anti-keystroke logging app protection. Keystroke logging, often referred to as keylogging or keyboard capturing, is the action of recording the keys struck on a keyboard so that the user of the computing device 310 is unaware that their actions are being monitored. Data can then be retrieved by the person operating the logging program.

In terms of anti-spoofing, further safety guards can be put in place where app protection 342 was enabled for an application using workspace app 70 or any other managed processes. Any malicious user action of unloading or tampering with the WASM Module can be detected to force app protection 342 to be turned on or to take any other necessary action.

In response to the browser 360 providing API to control screen capture behavior, then this can be leveraged for contextual tab aware protection.

The contextual tab aware protection as discussed above may be applied to applications that are accessed without a browser. These applications are native applications on the computing device 310. For example, a displayed page from an Excel spreadsheet may include sensitive content. Consequently, app protection 342 would be applied.

To determine which file within the native application is currently visible, UI automation may be used, such as OCR. The native file having the sensitive content would be on a list of files that are to have app protection enabled. That is, files would be individually identified as having sensitive data requiring app protection 342 to be enabled.

As will be appreciated by one of skill in the art upon reading the above disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

The invention claimed is:

1. A computing device comprising:
a display;
a browser configured to access a plurality of applications for display in a browser window, with each application associated with a respective browser tab within the browser window; and
a processor coupled to said display and configured to perform the following:
display content from an application associated with a selected browser tab, classify the selected browser tab, and
enable app protection to selectively block screenshots of the displayed content based on the classification of the selected browser tab;
wherein:
said processor is configured to classify the selected browser tab based on comparing an address of the application associated with the selected browser tab to an address list, with the classification being based on the address being on the address list; and
the address list is received from an access control service configured to authenticate a user of the computing device.

2. The computing device according to claim 1 wherein each application is classified as a corporate app or as a personal app, with said processor enabling app protection for each application that was classified as a corporate app.

3. The computing device according to claim 1 wherein said browser comprises a browser extension configured to provide an address for the application associated with the selected browser tab to said processor, with the selected browser tab being classified based on the provided address.

4. The computing device according to claim 1 further comprising hooks within the browser window to provide an address for the application associated with the selected browser tab to said processor, with the selected browser tab being classified based on the provided address.

5. The computing device according to claim 1 wherein the application associated with the selected browser tab is accessed via a reverse proxy, with the reverse proxy providing an address for the application associated with the selected browser tab to said processor, and with the selected browser tab being classified based on the provided address.

6. The computing device according to claim 1 wherein an identifier file is loaded into the selected browser tab in response to the application associated therewith being accessed, with the identifier file including a unique identifier indicating that the application associated with the selected browser tab is to have app protection enabled, and wherein said processor is further configured to enable app protection after verification of the unique identifier.

7. The computing device according to claim 1 wherein an enablement file is loaded into said browser in response to said browser being launched, with the enablement file configured to enable or disable app protection based on receiving a command; and wherein said processor is further configured to send the command to the enablement file based on the classification of the selected browser tab.

8. The computing device according to claim 7 wherein a default of the enablement file when loaded is to enable app protection.

9. The computing device according to claim 1 wherein said processor is further configured to monitor the browser tabs to detect the selected browser tab.

10. The computing device according to claim 1 wherein said browser is configured to access the plurality of applications for display in a plurality of browser windows, with each application associated with a respective browser tab within a respective browser window, and wherein said processor is further configured to determine which browser window includes the selected browser tab.

11. A computing device comprising:
   a display;
   a browser configured to access a plurality of applications for display in a browser window, with each application associated with a respective browser tab within the browser window; and
   a processor coupled to said display and configured to perform the following:
      display content from an application associated with a selected browser tab,
      classify the selected browser tab, and
      enable app protection to selectively block screenshots of the displayed content based on the classification of the selected browser tab;
   wherein:
   an identifier file is loaded into the selected browser tab in response to the application associated therewith being accessed, with the identifier file including a unique identifier indicating that the application associated with the selected browser tab is to have app protection enabled, and wherein said processor is further configured to enable app protection after verification of the unique identifier; and
   the unique identifier is verified based on comparing the unique identifier to a list of unique identifiers, with verification being based on the unique identifier being on the list.

12. A method comprising:
   operating a browser to access a plurality of applications for display in a browser window, with each application associated with a respective browser tab within the browser window;
   displaying content from an application associated with a selected browser tab;
   classifying the selected browser tab; and
   enabling app protection to selectively block screenshots of the displayed content based on the classification of the selected browser tab;
   wherein:
   classifying the selected browser tab is based on comparing an address of the application associated with the selected browser tab to an address list, with the classification being based on the address being on the address list; and
   the address list is received from an access control service configured to authenticate a user of the computing device.

13. The method according to claim 12 further comprising loading a browser extension into the browser, with the browser extension being configured to provide an address for the application associated with the selected browser tab, and wherein classifying the selected browser tab is based on the provided address.

14. The method according to claim 12 further comprising hooking the browser window to provide an address for the application associated with the selected browser tab, with the selected browser tab being classified based on the provided address.

15. The method according to claim 12 further comprising accessing the application associated with the selected browser tab is accessed via a reverse proxy, with the reverse proxy providing an address for the application associated with the selected browser tab, and with the selected browser tab being classified based on the provided address.

16. The method according to claim 12 further comprising loading an identifier file into the selected browser tab in response to the application associated therewith being accessed, with the identifier file including a unique identifier indicating that the application associated with the selected browser tab is to have app protection enabled, and wherein app protection is enabled after verification of the unique identifier.

* * * * *